(12) United States Patent
Bickford et al.

(10) Patent No.: US 8,302,063 B2
(45) Date of Patent: Oct. 30, 2012

(54) METHOD AND SYSTEM TO OPTIMIZE SEMICONDUCTOR PRODUCTS FOR POWER, PERFORMANCE, NOISE, AND COST THROUGH USE OF VARIABLE POWER SUPPLY VOLTAGE COMPRESSION

(75) Inventors: Jeanne P. Bickford, Essex Junction, VT (US); Umberto Garofano, Essex Junction, VT (US); James E. Jasmin, Jeffersonville, VT (US); Ivan L. Wemple, Shelburne, VT (US); Tad J. Wilder, South Hero, VT (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 12/782,359

(22) Filed: May 18, 2010

(65) Prior Publication Data

US 2011/0288829 A1    Nov. 24, 2011

(51) Int. Cl.
  *G06F 17/50*    (2006.01)
(52) U.S. Cl. ........ 716/132; 716/100; 716/110; 716/111; 703/2; 703/13
(58) Field of Classification Search .............. 716/100, 716/106, 110, 111, 115, 132; 703/2, 13
See application file for complete search history.

(56) References Cited

U.S. PATENT DOCUMENTS

| | | | | |
|---|---|---|---|---|
| 5,999,714 | A * | 12/1999 | Conn et al. | 716/115 |
| 6,493,853 | B1 * | 12/2002 | Savithri et al. | 716/115 |
| 6,532,574 | B1 * | 3/2003 | Durham et al. | 327/292 |
| 6,654,943 | B2 * | 11/2003 | Clabes et al. | 716/104 |
| 6,721,924 | B2 | 4/2004 | Patra et al. | |
| 7,979,825 | B2 * | 7/2011 | Elfadel et al. | 716/111 |
| 2005/0257178 | A1 * | 11/2005 | Daems et al. | 716/2 |

* cited by examiner

*Primary Examiner* — Sun Lin
(74) *Attorney, Agent, or Firm* — Richard Kotulak; Roberts Mlotkowski Safran & Cole, P.C.

(57) ABSTRACT

A method of integrated circuit design and, more particularly, a method and system to optimize semiconductor products for power, performance, noise, die area, and cost through use of variable power supply voltage compression. The method is implemented in a computer-based tool and includes: embedding relationships in an optimization tool running on a computing device, wherein the relationships are based at least partly on performance, power-supply noise, die area, and power; inputting a set of product data and a set of technology data in the optimization tool running on the computing device; and determining product design parameters including power supply voltage, switching-noise-induced power supply voltage variation, and decap area. The determining is based on the relationships, the product data, and the technology data and is performed using the computing device running the optimization tool.

20 Claims, 5 Drawing Sheets

METHOD AND SYSTEM TO OPTIMIZE SEMICONDUCTOR PRODUCTS FOR POWER, PERFORMANCE, NOISE, AND COST THROUGH USE OF VARIABLE POWER SUPPLY VOLTAGE COMPRESSION

FIELD OF THE INVENTION

The present invention relates to a method of integrated circuit design and, more particularly, to a method and system to optimize semiconductor products for power, performance, noise, die area, and ultimately cost through use of variable power supply voltage compression.

BACKGROUND

Newer integrated circuit products have stringent power and performance requirements. For example, there is an almost constant drive in the industry toward using lower voltages in order to minimize the power required to operate a chip. Chip design considerations must include factors associated with technology data, like the allowed operating voltage range of each library element, the transient noise sensitivity of circuit functionality to transient power supply noise, etc., and factors associated with product data, like the power-supply voltage tolerances, the selected package type and size, etc.

One particular area of variability in circuit design is the use of decoupling capacitors. On-chip decoupling capacitors (commonly referred to as "decaps") are typically used to prevent noise-related circuit degradation. More specifically, in advanced electronic computing systems, the decoupling capacitors serve as a charge reservoir to support instantaneous current surges that accompany simultaneous circuit switching. The decoupling capacitors are recharged by the external power supply, but the time-varying nature of the recharge/discharge process creates undesirable variation in the on-chip power-supply voltage. Generally speaking, the magnitude of the voltage variation can be reduced by adding more decoupling capacitors. Constraining the voltage variation is advantageous because it restricts the "voltage loss" between the power supply and the on-chip circuits. If a particular minimum circuit voltage is required to achieve a specified level of circuit performance, a reduction in voltage variation permits the use of lower power-supply voltages. This, in turn, reduces power consumption.

Decoupling capacitors may be employed on chip and across all levels of packaging, including single chip and multi chip modules, boards and back planes. The number of decoupling capacitors in a circuit design can be increased to reduce the amount of transient power supply noise; however, this noise reduction comes at the cost of the larger physical area required to accommodate the increased number of decoupling capacitors. There is no current methodology for reliably managing the performance, power-supply noise, die area, and power trade-offs while optimizing cost in a circuit design.

Accordingly, there exists a need in the art to overcome the deficiencies and limitations described hereinabove.

SUMMARY

In a first aspect of the invention, there is a method to optimize semiconductor products. The method includes embedding relationships in an optimization tool running on a computing device, wherein the relationships are based at least partly on performance, power-supply noise, die area, and power. The method also includes inputting a set of product data and a set of technology data in the optimization tool running on the computing device. The method further includes determining product design parameters comprising power supply voltage, switching-noise-induced power supply voltage variation, and decap area, wherein the determining is based on the relationships, the product data, and the technology data and is performed using the computing device running the optimization tool.

In a second aspect of the invention, there is a method to optimize semiconductor products. The method includes: defining at least one first relationship between decap use and transient power supply noise; defining at least one second relationship between decap use and die area; defining at least one third relationship associated with technology and library element minimum and maximum voltages; defining at least one fourth relationship between power supply voltage and semiconductor product performance; and defining at least one fifth relationship between system power supply and system power supply tolerance. The method also method includes embedding the first, second, third, fourth, and fifth relationships in an optimization tool running on a computer device and inputting product data and technology data associated with a circuit in the optimization tool. The method also includes calculating product design parameters comprising power supply voltage, noise-induced voltage variation, and decap area, wherein the calculating is performed using the optimization tool and is based on the first, second, third, fourth, and fifth relationships, the product data, and technology data.

In a third aspect of the invention, there is a computer program product comprising computer program code embodied in a tangible storage medium. The computer program code causes the computer device to: receive a set of user-defined relationships associated with circuit design; receive a set of product data and a set of technology data associated with a product being designed; calculate and output a power supply voltage, a noise-induced voltage variation, and a decap area, wherein the calculating is based upon the set of product data, the set of technology data, and the set of user-defined relationships; receive a change to the set of product data; and re-calculate and output the power supply voltage, the noise-induced voltage variation, and the decap area, based upon the changed set of product data and the set of user-defined relationships.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The present invention relates to a method of integrated circuit design and, more particularly, to a method and system to optimize semiconductor products for power, performance, noise, die area, and ultimately cost through use of variable power supply voltage compression. More specifically, the present invention provides a method and tool that receives user input, technology definitions, library element information, and definitions of decap impact on noise and provides an evaluation of the impact of decap use on the power supply voltage. The voltage to be used for circuit performance and timing analysis (the "timing voltage") and the voltage to be used for estimating power consumption (the "power voltage") can both be derived from the power supply voltage. The switching-noise-induced power supply voltage variation (the "noise-induced voltage variation") can be used for assessing the design's noise immunity. Implementations of the invention permit a user to examine design trade-offs, such as, for example, physical area associated with the number of decaps versus power, by reducing the magnitude of transient power-supply noise, a lower power supply voltage can be utilized to reduce power consumption. In this manner, embodiments of the invention provide the ability to optimize a product design in terms of power, performance, noise, die area, and ultimately cost.

In exemplary embodiments, a method includes defining one or more relationships between decap use and transient power supply noise, defining one or more relationships associated with technology and library element minimum and maximum voltages, and embedding these relationships in a computer-based design tool. A user provides (i.e., inputs) product data to the tool, such as, for example, product power supply information, product target power supply voltage compression (i.e., transient power supply noise), and library elements to be used in the product, etc. The tool uses the product and technology data and the embedded relationships to determine product design parameters including, but not limited to, voltages for timing and power, the noise-induced voltage variation, and an amount of decaps. The user may change one or more inputs to the tool to iteratively examine the effects on the determined product design parameters. In this manner, implementations of the invention may be used to optimize the circuit design by examining and managing design trade-offs.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium. In embodiments, the computer program product comprises computer program code embodied (i.e., stored) in a tangible storage medium which, when executed on a computer device, causes the computer device to perform one or more of the processes described herein. The tangible storage medium may include, but is not limited to, a semiconductor or solid state memory, magnetic tape, a removable computer diskette, a hard drive, a random access memory (RAM), a read-only memory (ROM), a rigid magnetic disk, and an optical disk (e.g., compact disk-read only memory (CD-ROM), compact disk-read/write (CD-R/W), and DVD).

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

- an electrical connection having one or more wires,
- a portable computer diskette,
- a hard disk,
- a random access memory (RAM),
- a read-only memory (ROM),
- an erasable programmable read-only memory (EPROM or Flash memory),
- an optical fiber,
- a portable compact disc read-only memory (CDROM),
- an optical storage device,
- a transmission media such as those supporting the Internet or an intranet, or
- a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

Figure 1:
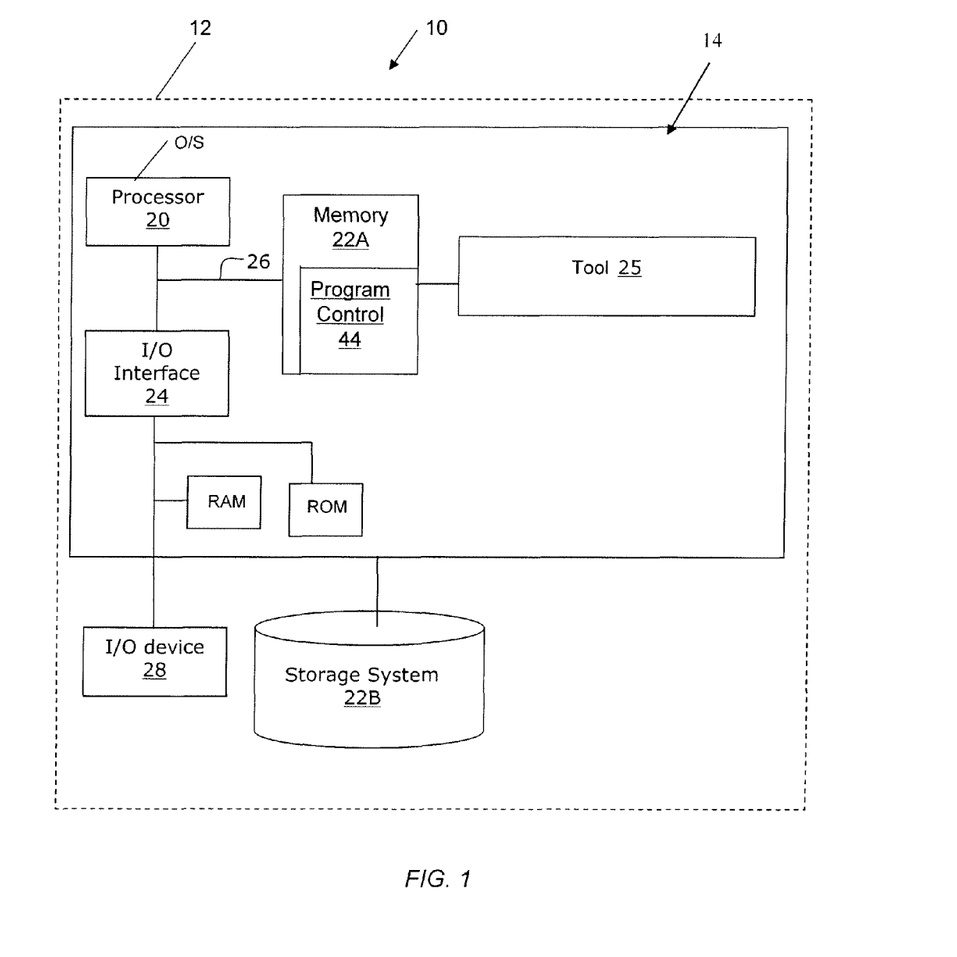
FIG. 1 shows an illustrative environment for implementing the steps in accordance with aspects of the invention.

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third-party service provider (any of which is generally represented in FIG. 1).

The computing device 14 includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. The bus 26 provides a communications link between each of the components in the computing device 14. In addition, the computing device includes random access memory (RAM), a read-only memory (ROM), and an operating system (O/S). In general, the processor 20 executes computer program code (e.g., program control 44), which can be stored in the memory 22A and/or storage system 22B. The program control 44 controls and/or executes the processes of the invention. While executing the computer program code, the processor 20 can read and/or write data to/from memory 22A, storage system 22B, and/or I/O interface 24.

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, a handheld device, PDA, handset, keyboard, etc.

The computing device 14 further includes one or more tools 25. For example, the tool 25 can be a software application, analysis tool, modeling tool and/or simulation tool implemented as one or more program code in the program control 44 stored in the memory 22A as separate or combined modules. The tool may comprise a dedicated hardware device such as a processor, memory, etc.

The computing device 14 can also comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
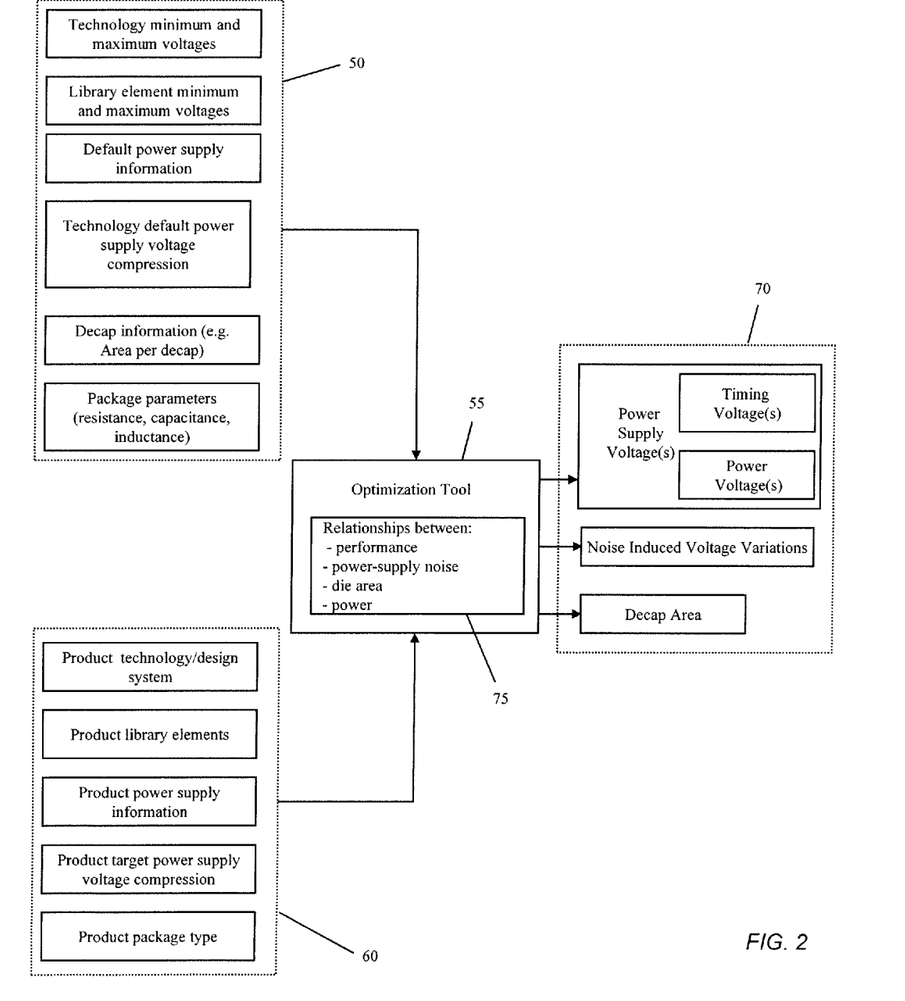
FIG. 2 shows a block diagram depicting functionality in accordance with aspects of the invention.

FIG. 2 is a block diagram depicting functionality associated with aspects of the invention. In embodiments, relationships 75 that define aspects of a circuit design are embedded in an optimization tool 55. The optimization tool 55 may comprise, for example, tool 25 described above with respect to FIG. 1, which may be a software application, analysis tool, modeling tool, spreadsheet, and/or simulation tool implemented as one or more program code in the program control 44 in a computing device. The optimization tool 55 may comprise a dedicated hardware device such as a processor, memory, etc. In a particular non-limiting exemplary example, the optimization tool 55 comprises a computer-based spreadsheet application that is capable of, among other functions, receiving and storing definitions of relationships between variables, receiving and storing input values for variables, and calculating output values based on the relationships and input values of the variables.

In accordance with aspects of the invention, the optimization tool 55 is configured to receive technology data 50. In embodiments, the technology data 50 may include, but are not limited to, technology minimum voltages, technology maximum voltages, library element minimum voltages, library element maximum voltages, power supply information, power supply voltage compression (i.e., transient power supply noise), characteristics of elements and/or decaps, on-chip area used per decap, and package parameters (e.g., resistance, capacitance, and inductance).

In embodiments, the relationships 75 are embedded into the optimization tool 55 using an I/O device, such as I/O device 28 described above with respect to FIG. 1. For example, the relationships 75 may be entered into a spreadsheet component of the optimization tool 55 using a graphical user interface and an input device such as, for example, a keyboard, mouse, etc. However, the invention is not limited to any particular method for embedding the relationships 75 in the optimization tool 55, and any suitable method may be used within the scope of the invention. In accordance with aspects of the invention, the relationships 75 include but are not limited to the following: the relationship between decap use and transient power supply noise, the relationship between decap use and die area, the relationship associated with technology and library element minimum and maximum voltages, the relationship between power supply voltage and semiconductor product performance, and the relationship between system power supply and system power supply tolerance. The relationships 75 may be represented by any combination of logical, mathematical, and functional definitions and/or expressions. Although the particular relationships may vary with any given design, the aforementioned types of relationships are generally known in the art such that further explanation is not believed necessary.

Still referring to FIG. 2, the optimization tool 55 is configured to additionally receive product data 60 related to an integrated circuit product being designed. In accordance with aspects of the invention, the product data 60 includes, but is not limited to the following: product technology/design system, product library elements, product power supply information, product target supply voltage compression, (i.e., target transient power supply noise), and product package type. In embodiments, the technology data 50 and the product data 60 is input into the optimization tool 55 using an I/O device, such as I/O device 28 described above with respect to FIG. 1. For example, the inputting of data may comprise entering values into a spreadsheet field and/or selecting one of plural options in a spreadsheet field.

According to aspects of the invention, the product data 60 represents a user's definition of an iteration of a design of a product. The optimization tool 55 is configured to determine design parameters 70 based on the relationships 75, the technology data 50, and the product data 60 and using mathematical and/or logical computation methodologies that are programmed in or accessible by the optimization tool 55. More specifically, in embodiments, the optimization tool 55 calculates power supply voltages, timing voltages, power voltages, noise-induced voltage variation, and on-chip decap area for the given set of relationships 75, technology data 50, and product data 60. The design parameters 70 may be output by the optimization tool 55 in any suitable way, such as, for example, displaying the design parameters 70 on a computer display, printing, storage to disk or other memory, etc.

In embodiments, the optimization tool 55 is configured to re-calculate the design parameters 70 each time a user changes at least one of the product data 60 values. In this manner, a user may enter a first set of product data 60 (i.e., a first configuration of a product design), be informed of the design parameters 70 that result from the first set of product data 60, enter a second set of product data 60 by adjusting/ changing at least one value of the product data 60, and be informed of the design parameters 70 that result from the second set of product data 60. Accordingly, in implementations, a user may iteratively examine how different sets of product data 60 (i.e., different configurations of a product design) yield different design parameters 70, thus making it possible for a user to employ the optimization 55 tool to manage trade-offs amongst the product data 60 in order to optimize the operational design parameters 70 of a product design.

As a non-limiting exemplary illustration, a user might enter a first set of product data 60 which results in a first set of design parameters 70. Upon inspection of the calculated design parameters 70, the user might determine that the noise-induced voltage variation is unacceptable (i.e., too high). Accordingly, the user might adjust the product data 60 by inputting a lower value for target power supply voltage compression, which causes the optimization tool 55 to calculate a second set of design parameters 70. The second set of design parameters 70 may differ from the first set of design parameters 70 due to the change in at least one value of the product data 60. In this example, the noise-induced voltage variation might decrease while the decap area increases. In this manner, a user may utilize the optimization tool 55 to examine how different designs (i.e., different sets of product data 60) produce different operational results (i.e., different sets of design parameters 70). This can be useful, for example, for managing design trade-offs while optimizing a product design for power, performance, noise, die area, and ultimately cost.

Exemplary Flow Diagrams

Figure 3:
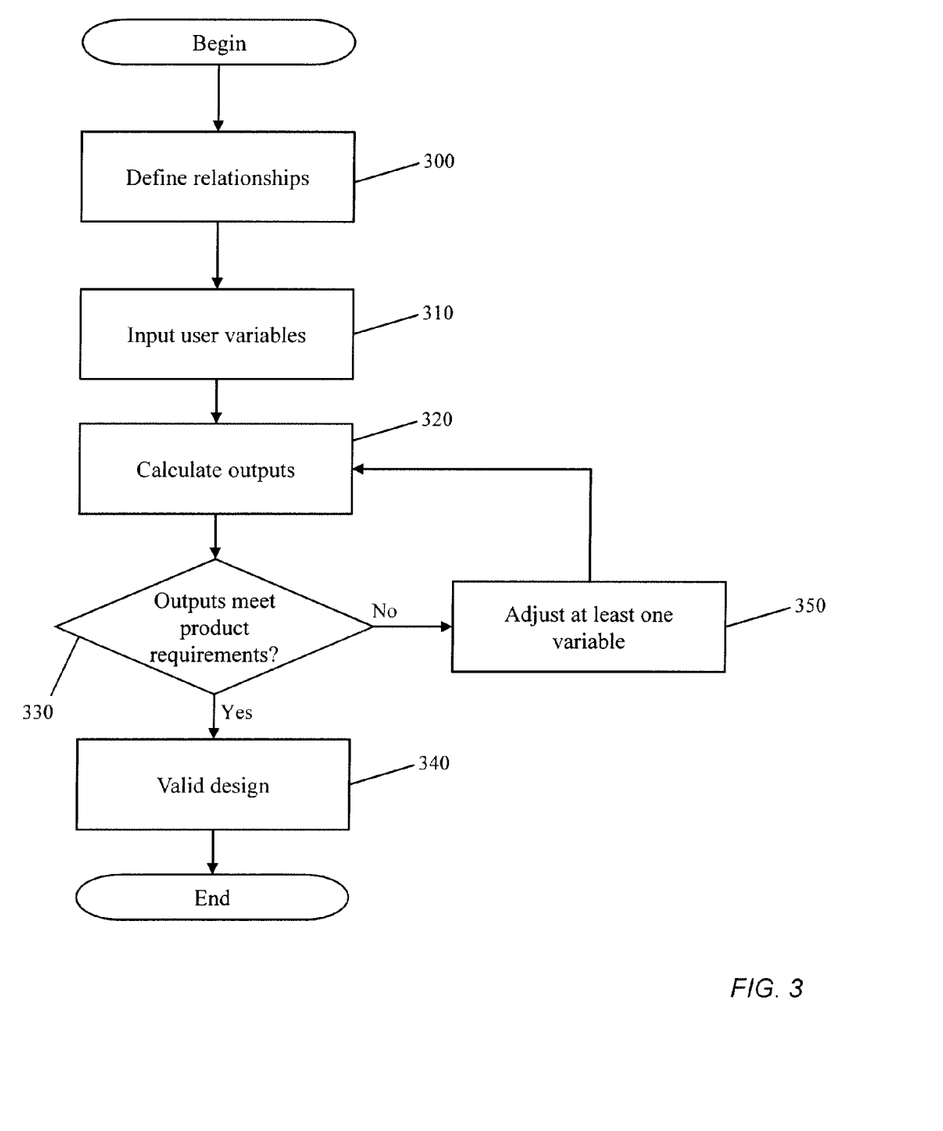
FIGS. 3-5 show flow diagrams used for example, in semiconductor IC logic design, in accordance with aspects of the invention.
Figure 4:
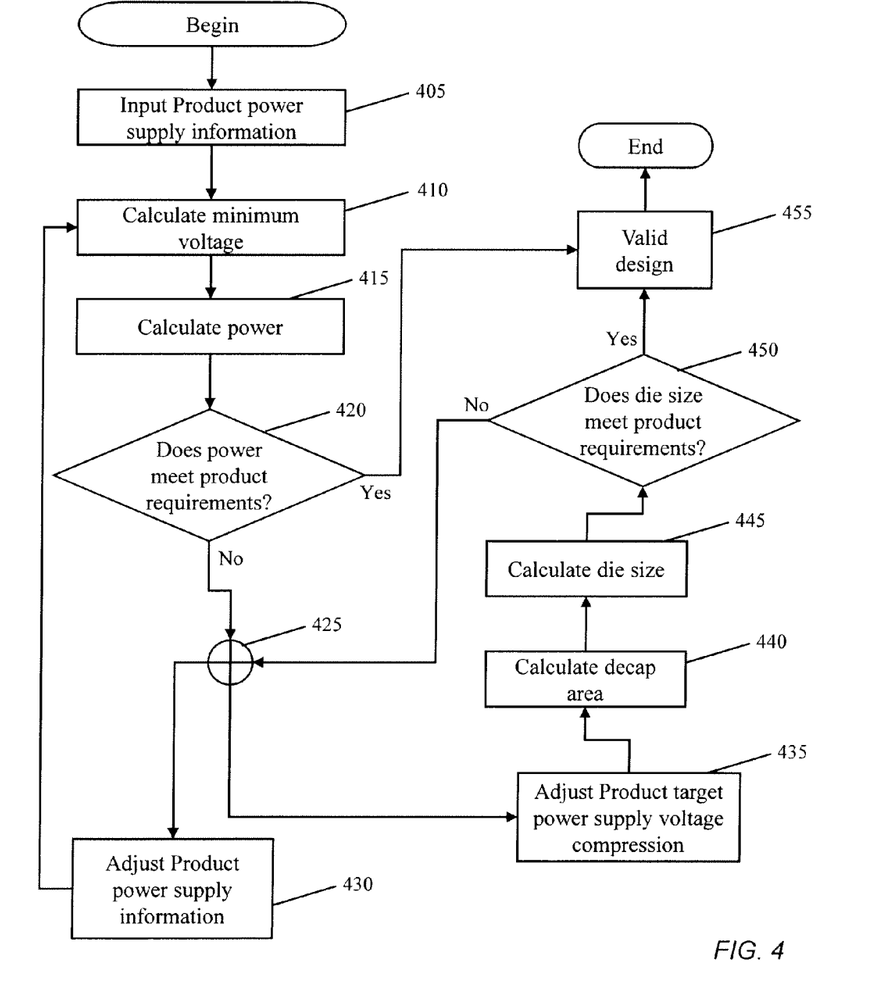
Figure 5:
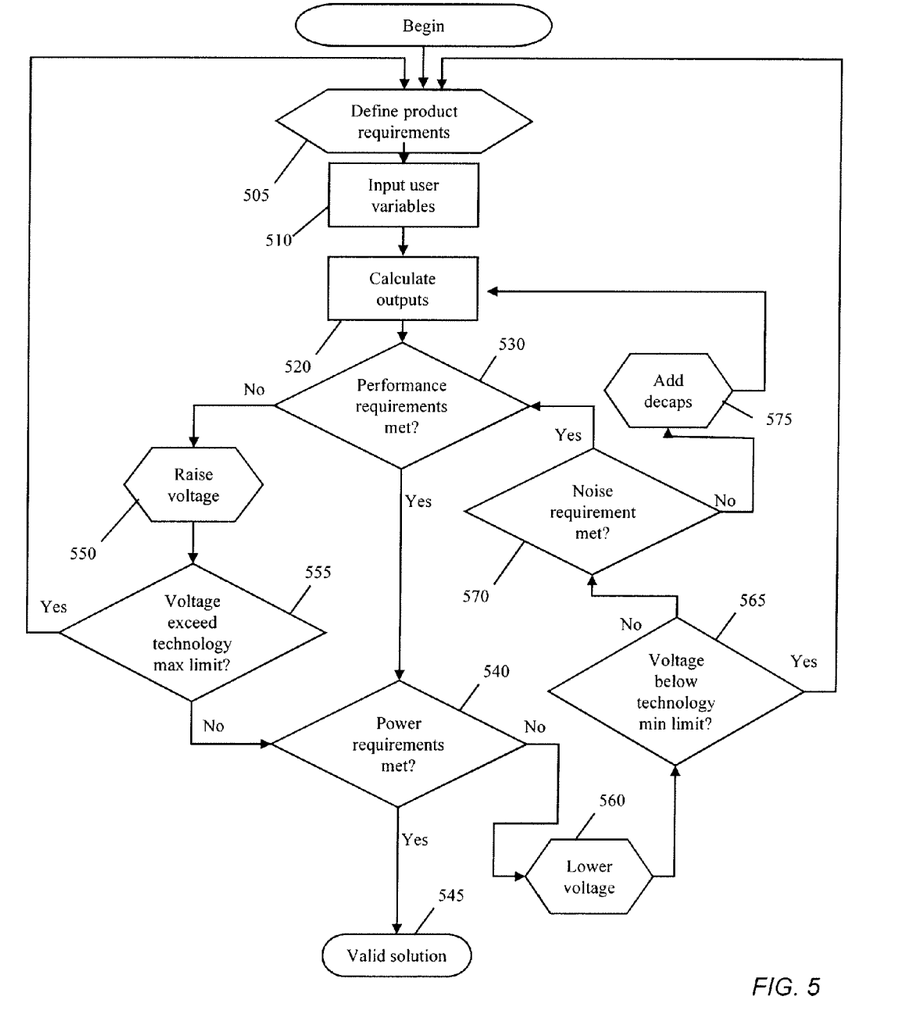

FIGS. 3-5 illustrate a process flow in accordance with aspects of the invention. The steps of FIGS. 3-5 may be implemented in the environment of FIGS. 1 and/or 2, for example. The flow diagrams may equally represent a high-level block diagram or a swim-lane diagram of the invention. The flowchart and/or block diagrams in FIGS. 3-5 illustrate the architecture, functionality, and operation of possible implementations of systems, methods and computer program products according to various embodiments of the present invention. In this regard, each block in the flowchart, block diagram or swim-lane diagram may represent a module, segment, or portion of code, which comprises one or more executable instructions for implementing the specified logical function(s). It should also be noted that, in some alternative implementations, the functions noted in the blocks may occur out of the order noted in the figure. For example, two blocks shown in succession may, in fact, be executed substantially concurrently, or the blocks may sometimes be executed in the reverse order, depending upon the functionality involved. Each block of each flowchart and combinations of the flowchart illustration can be implemented by special purpose hardware-based systems that perform the specified functions or acts, or combinations of special purpose hardware and computer instructions and/or software, as described above.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 3 shows a flow diagram of a circuit design optimization method in accordance with aspects of the invention. At step 300, relationships that define aspects of an integrated circuit design are defined. In embodiments, this comprises embedding relationships 75 in the optimization tool 55, as described above with respect to FIG. 2.

At step 310, a user inputs variables. In embodiments, this comprises inputting technology data 50 and product data 60 in the optimization tool 55, as described above with respect to FIG. 2.

At step 320, the optimization tool 55 calculates outputs based on the relationships from step 300 and the variables from step 310. In embodiments, this comprises the optimization tool 55 determining design parameters 70 as described above with respect to FIG. 2.

At step 330, the user or program logic in a processor determines whether the outputs from step 320 meet the product requirements. In embodiments, the user or program logic in a processor compares the calculated design parameters 70 to optimize the product for power, performance, noise, die area, and ultimately cost. Step 330 may additionally or alternatively comprise the user or program logic in a processor calculating a power from the voltages provided in the design parameters 70 and determining if that power is acceptable for the product. Step 330 may additionally or alternatively comprise the user or program logic in a processor determining whether the voltages provided in the design parameters 70 are acceptable to meet product performance requirements. Step 330 may additionally or alternatively comprise the user or program logic in a processor calculating a die size based on the design parameters 70 and determining whether that die size is acceptable for the product. Step 330 may additionally or alternatively comprise the user or program logic in a processor determining whether the voltages provided in the design parameters 70 are within tolerable minimum and maximum voltages for the selected technology of the product.

The product design is deemed valid at step 340 when the user or program logic in a processor is satisfied that the outputs meet the requirements at step 330. Alternatively, when the one or more of the outputs does not satisfy the requirements at step 330, the user adjusts at least one input variable at step 350, and the outputs are re-calculated at step 320 based on the adjusted input variables. The process proceeds in this manner until the user finds a valid design or decides that a valid design is impossible given the relationships defined in step 300.

FIG. 4 shows a flow diagram of a circuit design optimization method in accordance with aspects of the invention. The method depicted in FIG. 4 represents but one of many possible collections of steps that a user might employ in accordance with aspects of the invention when using the optimization tool 55. More specifically, the method depicted in FIG. 4 involves adjusting two of many possible product data 60 (e.g., product power supply information, product target power supply voltage compression) and examining the effects of these adjustments on two of many possible calculated design parameters 70 (e.g., power supply voltage(s) and decap area). The exemplary process depicted in FIG. 4 is not meant to limit the scope of the claimed invention, and it is understood that the optimization tool 55 may be used with other combinations of embedded relationships 75, input technology data 50, input product data 60, and calculated design parameters 70.

At step 405, a user inputs a product power supply information into the optimization tool 55. In embodiments, step 405 is performed as part of inputting the product data 60 into the optimization tool, as described above with respect to FIGS. 2 and 3. At step 410, the optimization tool 55 calculates a minimum voltage as part of the design parameters 70. At step 415, the user or program logic in a processor calculates a power associated with the design based on the minimum voltage from step 410. Determining the power for a design given a voltage and other design data is known such that further explanation is not believed necessary.

At step 420, the user or program logic in a processor determines whether the power from step 415 meets the product requirements. In embodiments, this involves comparing the calculated power to a power requirement for the product. If the calculated power meets (i.e., satisfies) the product requirements, then the design may be deemed valid at step 455. On the other hand, if the calculated power does not meet the product requirements, then the process proceeds to step 425 where the user chooses to either adjust the product power supply information at step 430 or adjust the product target power supply voltage compression at step 435. Both step 430 and 435 involve adjusting the value of one of the product data 60 in the optimization tool, and may be performed as already described herein.

When the user elects to adjust the product power supply information at step 430, the user changes the value of the product power supply in the optimization tool 55 and the tool re-calculates the design parameters 70 including the minimum voltage, as represented by the return of the process to step 410. Alternatively, when the user elects to adjust the product target power supply voltage compression at step 435, the user changes the value of the product target power supply voltage compression in the optimization tool 55 and the tool re-calculates the design parameters 70 including calculating a decap area at step 440. At step 445, the user or program logic in a processor calculates the die size of the product design using the decap area from step 440. Determining the die size for a design given a decap area and other design data is known such that further explanation is not believed necessary.

At step 450, the user or program logic in a processor determines whether the die size from step 445 meets the product requirements. In embodiments, this involves comparing the calculated die size to a requirement for the product. If the calculated die size satisfies the product requirements, then the design may be deemed valid at step 455. On the other hand, if the calculated die size does not meet the product requirements, then the process reverts to decision 425 where the user again chooses to either adjust the product power supply information at step 430 or adjust the target product power supply voltage compression at step 435. In this manner, the user may iteratively adjust one or more of the product data 60 values in the optimization tool 55 and examine the effect that such adjustments have on the calculated design parameters 70 and also on other design variables (e.g., power, die size, etc.) that are based on (i.e., calculated from) the calculated design parameters 70.

FIG. 5 shows a flow diagram of a circuit design optimization method in accordance with aspects of the invention. Like FIG. 4, the method depicted in FIG. 5 represents but one of many possible collections of steps that a user might employ in accordance with aspects of the invention when using the optimization tool 55. The exemplary process depicted in FIG. 5 is not meant to limit the scope of the claimed invention, and it is understood that the optimization tool 55 may be used with other combinations of embedded relationships 75, input technology data 50, input product data 60, and calculated design parameters 70.

At step 505, a user defines product requirements. At step 510, user variables are input into the optimization tool 55 as described herein. Step 510 may include, for example, inputting technology data 50 and product data 60, including but not limited to technology default power supply voltage compression, decap information, product library elements, and product power supply information, etc. At step 520, the optimization tool 55 is used to calculate design parameters 70 (i.e., outputs of the optimization tool 55). In embodiments, the outputs at step 520 are based on the embedded relationships 75, input technology data 50, and input product data 60.

At step 530, a user or program logic in a processor determines whether the performance requirement for the product is met. In embodiments, this may involve, for example, comparing the timing voltages calculated by the optimization tool 55 to the timing voltages needed to meet a predetermined performance requirement. If the performance requirement is met (i.e., satisfied) at step 530, then the process proceeds to step 540 where the user or program logic in a processor determines whether the power requirements are met. In embodiments, this may involve, for example, determining the power of the design from the calculated design parameters 70 and comparing the power to a predetermined power requirement. If the determined power meets the power requirements at step 540, then the design may be deemed to be a valid design solution at step 545.

Referring back to step 530, if it is determined that the performance requirements are not met, then at step 550 the user raises the voltage by adjusting one or more values of the product data 60 in the optimization tool 55. As a result of the user changing values in step 550, the optimization tool 55 automatically re-calculates the design parameters 70. At step 555, the user or program logic in a processor determines whether the re-calculated the design parameters 70 result in a voltage that exceeds the maximum voltage for the technology (i.e., the technology maximum limit). If, at step 555, the voltage does not exceed the technology maximum limit, then the process proceeds to step 540 where the power requirements are examined as already described herein. If, at step 555, the voltage does exceed the technology maximum limit, then the design is likely invalid and the process reverts to step 505 where the user may change the product requirements.

Referring back to step 540, if it is determined that the power requirements are not met, then at step 560 the user lowers the voltage by adjusting one or more values of the product data 60 in the optimization tool 55. As a result of the user changing values in step 560, the optimization tool 55 automatically re-calculates the design parameters 70. At step 565, the user or program logic in a processor determines whether the re-calculated the design parameters 70 result in a voltage that falls below the minimum voltage for the technology (i.e., the technology minimum limit). If, at step 565, the voltage does fall below the technology minimum limit, then the design is likely invalid and the process reverts to step 505 where the user may change the product requirements.

On the other hand, if it is determined at step 565 that the voltage does not fall below the technology minimum limit, then at step 570 the user determines whether the noise requirement for the product is met. In embodiments, step 570 involves the user determining if the noise-induced voltage variation of the design parameters 70 satisfies the predetermined noise requirement for the product. If the noise requirement is met, then the process returns to step 530 where the performance requirement is again examined since the voltage was lowered at step 560 and this may affect the performance of the product. If, at step 570, the noise requirement is not met, then at step 575 the user adds one or more decaps to the product design by adjusting one or more values of the product data 60 in the optimization tool 55. From step 575, the process returns to step 515, which results in starting over the verification process for the design based on the increased number of decaps. In this manner, a user may employ the optimization tool 55 as part of a comprehensive design process for examining trade-offs between performance, power-supply noise, die area, and power.

Although the invention has been described in terms of managing trade-offs in terms of performance, power-supply noise, die area, and power, the scope of the invention is not limited to these design parameters. For example, in other exemplary implementations of the invention, the embedded relationships 75 may include cost relationships, such as cost per die area, cost per voltage regulator, etc. Moreover, optimization tool 55 may be configured to permit a user to select one of many different voltage regulators as part of the product data 60. The die area for a design depends on, among other things, the amount/number of decaps, which in turn depends on the product target power supply voltage compression input by the user as product data 60. In this manner, the optimization tool 55 may be configured to calculate a system cost based on: (i) the user input of the product target power supply voltage compression and selection of a voltage regulator in the product data 60, and (ii) the relationships that define cost in terms of die size and voltage regulator in the embedded relationships 75. For example, the optimization tool 55 may be employed by the user to create a comparison of costs such as that shown in Table 1.

TABLE 1

| Die Area Cost | Regulator Cost | System Cost = Die Cost + Regulator Cost |
|---|---|---|
| Die Cost ($) for Product Power Supply Voltage Compression Target 1 | Cost ($) Voltage Regulator 1 | System Cost (1,1) |
| Die Cost ($) for Product Power Supply Voltage Compression Target 2 | Cost ($) Voltage Regulator 1 | System Cost (2,1) |
| Die Cost ($) for Product Power Supply Voltage Compression Target 1 | Cost ($) Voltage Regulator 2 | System Cost (1,2) |
| Die Cost ($) for Product Power Supply Voltage Compression Target 2 | Cost ($) Voltage Regulator 2 | System Cost (2,2) |
| Die Cost ($) for Product Power Supply Voltage Compression Target N | Cost ($) Voltage Regulator M | System Cost (N,M) |

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, where applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed:

1. A method to optimize semiconductor products, comprising:
   embedding relationships in an optimization tool running on a computing device, wherein the relationships are based at least partly on performance, power-supply noise, die area, and power of the semiconductor products;
   inputting a set of product data and a set of technology data in the optimization tool running on the computing device; and
   determining product design parameters comprising a power supply voltage, a switching-noise-induced power supply voltage variation, and a decap area, wherein the determining is based on the relationships, the product data, and the technology data and is performed using the computing device running the optimization tool.

2. The method of claim 1, further comprising:
   inputting a second set of product data in the optimization tool; and determining a second set of product design parameters based on the relationships and the second set of product data, and the technology data.

3. The method of claim 2, wherein the inputting a second set of product data comprises changing a value of at least one variable of the set of product data.

4. The method of claim 1, wherein the relationships include at least one of:
   at least one first relationship between decap use and transient power supply noise;
   at least one second relationship between decap use and die area; and
   at least one third relationship associated with technology and library element minimum and maximum voltages.

5. The method of claim 1, wherein the relationships include all of:
   at least one first relationship between decap use and transient power supply noise;
   at least one second relationship between decap use and die area; and
   at least one third relationship associated with technology and library element minimum and maximum voltages.

6. The method of claim 5, wherein the relationships further comprise:
   at least one fourth relationship between power supply voltage and semiconductor product performance; and at least one fifth relationship between system power supply and system power supply tolerance.

7. The method of claim 6, wherein:
   the relationships further comprise a cost per die area and a cost per type of voltage regulator;
   the set of product data includes a selected type of voltage regulator; and
   the determined product design parameters include a system cost based on the cost per die area, the determined decap area, the cost per type of voltage regulator, and the selected type of voltage regulator.

8. The method of claim 1, wherein:
   the relationships comprise a cost per die area and a cost per type of voltage regulator;
   the set of product data includes a selected type of voltage regulator; and
   the determined product design parameters include a system cost based on the cost per die area, the determined decap area, the cost per type of voltage regulator, and the selected type of voltage regulator.

9. The method of claim 1, wherein the set of technology data comprises:
   technology minimum voltages;
   technology maximum voltages;
   library element minimum voltages;
   library element maximum voltages;
   power supply information;
   technology default power supply voltage compression;
   decap information, wherein the decap information comprises area per decap; and
   package parameters, wherein the package parameters comprise package resistance, capacitance, and inductance.

10. The method of claim 1, wherein the set of product data comprises:
    at least one of product technology and design system;
    product library elements;
    product power supply information;
    product target power supply voltage compression; and
    product package type.

11. A method to optimize semiconductor products, comprising:
    defining at least one first relationship between decap use and transient power supply noise;
    defining at least one second relationship between decap use and die area;
    defining at least one third relationship associated with technology and library element minimum and maximum voltages;
    defining at least one fourth relationship between power supply voltage and semiconductor product performance;
    defining at least one fifth relationship between system power supply and system power supply tolerance;
    embedding the first, second, third, fourth, and fifth relationships in an optimization tool running on a computer device;
    inputting product data and technology data associated with a circuit in the optimization tool; and
    calculating product design parameters comprising a power supply voltage, a noise-induced voltage variation, and a decap area, wherein the calculating is performed using the optimization tool and is based on the first, second, third, fourth, and fifth relationships, the product data, and technology data.

12. The method of claim 11, further comprising:
    changing the product data; and
    re-calculating the product design parameters based on the changed product data.

13. The method of claim 11, further comprising:
    defining and embedding at least one sixth relationship defining die cost in terms of die area;
    defining and embedding at least one seventh relationship defining cost per regulator card; and
    determining a system cost based on the at least one sixth relationship, the at least one seventh relationship, and the product data.

14. The method of claim 11, wherein the technology data includes at least one of:
    technology minimum voltages;
    technology maximum voltages;
    library element minimum voltages;
    library element maximum voltages;
    power supply information;
    technology default power supply voltage compression;
    decap information, wherein the decap information comprises area per decap; and
    package parameters, wherein the package parameters comprise package resistance, capacitance, and inductance.

15. The method of claim 11, wherein the product data includes at least one of:
    at least one of product technology and design system;
    product library elements;
    product power supply information;
    product target supply voltage compression; and
    product package type.

16. The method of claim 11, wherein the product design parameters comprise all of: (i) the power supply voltage, (ii) the noise-induced voltage variation, (iii) the decap area, and (iv) a system cost.

17. A computer program product comprising computer program code embodied in a tangible storage medium which, when executed on a computer device, causes the computer device to perform:
    receiving a set of user-defined relationships associated with a circuit design;
    receiving a set of product data and a set of technology data associated with a product being designed;

calculating and outputting a power supply voltage, a noise-induced voltage variation, and a decap area, wherein the calculating is performed based upon the set of product data, the set of technology data, and the set of user-defined relationships;

receiving a change to the set of product data; and re-calculating and outputting the power supply voltage, the noise-induced voltage variation, and the decap area, based upon the changed set of product data and the set of user-defined relationships.

18. The computer program product of claim 17, wherein the set of user-defined relationships comprises at least one of:

at least one first relationship between decap use and transient power supply noise;

at least one second relationship between decap use and die area;

at least one third relationship associated with technology and library element minimum and maximum voltages;

at least one fourth relationship between power supply voltage and semiconductor product performance; and at least one fifth relationship between system power supply and system power supply tolerance.

19. The computer program product of claim 17, wherein:

the set of user-defined relationships comprises a cost per die area and a cost per type of voltage regulator;

the set of product data includes a selected type of voltage regulator; and the calculating comprises calculating a system cost based on the cost per die area, the decap area, the cost per type of voltage regulator, and the selected type of voltage regulator.

20. The computer program product of claim 17, wherein:

the set of technology data includes at least one of:

technology minimum voltages;
technology maximum voltages;
library element minimum voltages;
library element maximum voltages;
power supply information;
technology default power supply voltage compression;
decap information, wherein the decap information comprises area per decap; and
package parameters, wherein the package parameters comprise package resistance, capacitance, and inductance, and the set of product data includes at least one of:

at least one of product technology and design system;
product library elements;
product power supply information;
product target supply voltage compression; and
product package type.

* * * * *